(12) United States Patent
Berggren et al.

(10) Patent No.: US 10,551,832 B2
(45) Date of Patent: Feb. 4, 2020

(54) METHOD AND SYSTEM FOR TRANSPORTING AN AUTONOMOUS AGRICULTURAL VEHICLE

(71) Applicant: CNH Industrial America, LLC, New Holland, PA (US)

(72) Inventors: Michael Berggren, Davenport, IA (US); Brett Gutknecht, Cedar Falls, IA (US)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 15/689,012

(22) Filed: Aug. 29, 2017

(65) Prior Publication Data

US 2019/0064795 A1 Feb. 28, 2019

(51) Int. Cl.
| | | |
|---|---|---|
| *G05D 1/00* | (2006.01) | |
| *A01B 73/00* | (2006.01) | |
| *B60D 1/62* | (2006.01) | |
| *G05D 1/02* | (2020.01) | |
| *B60D 1/36* | (2006.01) | |
| *B60D 1/00* | (2006.01) | |

(52) U.S. Cl.
CPC ........... *G05D 1/0022* (2013.01); *A01B 73/00* (2013.01); *B60D 1/36* (2013.01); *B60D 1/62* (2013.01); *G05D 1/028* (2013.01); *B60D 2001/001* (2013.01); *G05D 2201/0201* (2013.01)

(58) Field of Classification Search
CPC ................. G05D 1/0022; G05D 1/028; G05D 2201/0201; A01B 73/00; A01D 75/002; B60D 1/36; B60D 1/62
See application file for complete search history.

(56) References Cited

U.S. PATENT DOCUMENTS

| | | | | |
|---|---|---|---|---|
| 3,053,551 A | * | 9/1962 | Kirkpatrick | B60D 1/14 280/444 |
| 4,368,899 A | * | 1/1983 | Smalley | B60D 1/04 280/421 |

(Continued)

FOREIGN PATENT DOCUMENTS

WO WO 2015151982 10/2015

*Primary Examiner* — Tony H Winner
*Assistant Examiner* — Michael R Stabley
(74) *Attorney, Agent, or Firm* — Patrick M. Sheldrake; Peter K. Zacharias (57) ABSTRACT

In one aspect, a method is disclosed for transporting an autonomous agricultural vehicle and an operator-driven agricultural vehicle from a first agricultural work site to a second agricultural work site. Each of the vehicles may have respective front ends and rear ends, and each of the respective rear ends may include a respective hitch. The method may include arranging the autonomous agricultural vehicle and the operator-driven agricultural vehicle such that the rear end of the autonomous agricultural vehicle faces the rear end of the operator-driven agricultural vehicle. The method may include coupling the hitch of the autonomous agricultural vehicle with the hitch of the operator-driven agricultural vehicle. The method may include towing the autonomous agricultural vehicle behind the operator-driven agricultural vehicle with the rear end of the autonomous agricultural vehicle facing a forward travel direction of the operator-driven agricultural vehicle.

17 Claims, 6 Drawing Sheets

(56) References Cited

U.S. PATENT DOCUMENTS

| | | | | |
|---|---|---|---|---|
| 4,909,341 | A * | 3/1990 | Rippingale | B62D 11/20 180/14.2 |
| 5,143,326 | A * | 9/1992 | Parks | B64D 1/22 244/118.1 |
| 5,169,197 | A * | 12/1992 | Underbakke | B64D 1/22 244/137.4 |
| 6,025,381 | A | 2/2000 | Bryant et al. | |
| 6,135,484 | A * | 10/2000 | Lauronen | B62D 13/02 280/444 |
| 6,148,255 | A | 11/2000 | Van Der Lely | |
| 7,277,784 | B2 | 10/2007 | Weiss | |
| 8,496,078 | B2 * | 7/2013 | Wellborn | B62D 59/04 180/14.2 |
| 8,639,408 | B2 | 1/2014 | Anderson | |
| 8,770,612 | B2 * | 7/2014 | Wendte | B60D 1/363 280/420 |
| 9,448,561 | B2 | 9/2016 | Fujimoto et al. | |
| 9,526,199 | B2 | 12/2016 | Matsuzaki et al. | |
| 2007/0194557 | A1 * | 8/2007 | Caporali | B60D 1/155 280/493 |
| 2008/0177435 | A1 * | 7/2008 | Caporali | B60D 1/155 701/23 |
| 2012/0041659 | A1 * | 2/2012 | Greene | B60D 1/30 701/70 |
| 2014/0257619 | A1 | 9/2014 | Rekow | |
| 2017/0177003 | A1 * | 6/2017 | Yokoyama | G05D 1/0295 |

\* cited by examiner

METHOD AND SYSTEM FOR TRANSPORTING AN AUTONOMOUS AGRICULTURAL VEHICLE

FIELD OF THE INVENTION

The present subject matter relates generally to autonomous agricultural vehicles, and, more particularly, to a method and system for transporting an autonomous agricultural vehicle from a first agricultural work site to a second agricultural work site.

BACKGROUND OF THE INVENTION

The operation of agricultural vehicles is becoming increasingly automated. For example, harvesters, planters, tillers and the like are often now configured to operate autonomously or semi-autonomously for various applications. Autonomous vehicles may be configured to follow a lead vehicle which may be driven by a human operator. In some applications, the autonomous vehicle may perform the same operation as the lead vehicle. For example, a lead harvester may be followed by an autonomous harvester, thereby doubling the effective width covered in a single pass of the harvesting operation. In other applications, the autonomous agricultural vehicle may perform a different operation than the operator-driven agricultural vehicle. For example, an operator-driven harvester may be followed by an autonomous agricultural vehicle towing a mobile storage compartment. The autonomous vehicle may align the mobile storage compartment with a conveyor outlet of the operator-driven harvester such that the operator-driven harvester may unload while moving.

Transporting such autonomous vehicles from one work site to another work site may require traveling on public roads. Operating autonomous agricultural vehicles on public roads, however, is heavily regulated in some areas and completely prohibited in others. Obtaining the requisite permits to operate an autonomous agricultural vehicle on public roads may be difficult, expensive, or even impossible.

Accordingly, a method and related system for transporting an autonomous agricultural vehicle from a first agricultural work site to a second agricultural work site would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for transporting an autonomous agricultural vehicle and an operator-driven agricultural vehicle from a first agricultural work site to a second agricultural work site. Each of the vehicles may have respective front ends and rear ends, and each of the respective rear ends may include a respective hitch. The method may include arranging the autonomous agricultural vehicle and the operator-driven agricultural vehicle such that the rear end of the autonomous agricultural vehicle faces the rear end of the operator-driven agricultural vehicle. The method may include coupling the hitch of the autonomous agricultural vehicle with the hitch of the operator-driven agricultural vehicle. The method may include towing the autonomous agricultural vehicle behind the operator-driven agricultural vehicle with the rear end of the autonomous agricultural vehicle facing a forward travel direction of the operator-driven agricultural vehicle.

In another aspect, the present subject matter is directed to a system for transporting autonomous agricultural vehicles. The system may include an operator-driven agricultural vehicle configured to be driven by an operator. The operator-driven agricultural vehicle may include a front end facing towards a forward travel direction of the operator-driven agricultural vehicle, a rear end facing away from the forward travel direction, and a hitch attached to the rear end. The system may include an autonomous agricultural vehicle configured for autonomous operation. The autonomous agricultural vehicle may include a front end, an opposite rear end, and a hitch attached to the rear end of the autonomous agricultural vehicle. The hitch of the autonomous agricultural vehicle may be coupled with the hitch of the operator-driven agricultural vehicle such that the operator-driven agricultural vehicle is configured to tow the autonomous agricultural vehicle with the rear end of the autonomous agricultural vehicle facing the forward travel direction of the operator-driven agricultural vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and system for transporting an autonomous agricultural vehicle. Specifically, in several embodiments, a hitch of an autonomous agricultural vehicle may be coupled with a hitch of an operator-driven agricultural vehicle such that the autonomous agricultural vehicle may be towed behind the operator-driven agricultural vehicle. In some embodiments, the autonomous agricultural vehicle may be towed with the rear end of the autonomous agricultural vehicle facing the rear end of the operator-driven agricultural vehicle such that the rear end of the autonomous agricultural vehicle faces a forward travel direction of the operator-driven agricultural vehicle.

This configuration may provide several advantages. For example, many agricultural vehicles include implements attached to their front ends. These implements may be large and difficult to remove or pivot such that the front of the vehicle may be configured with a hitch. Thus, towing such agricultural vehicles in a forward-facing orientation may be impractical. A harvester is one example of such an agricultural vehicle having an implement attached to the front end. For example, harvesters may have headers attached to their front ends, as explained in greater detail below. While driver-operated agricultural vehicles may be driven on many public roads and/or highways, operating autonomous agricultural vehicles on public roads may be heavily regulated, or even prohibited.

The systems and methods disclosed herein provide for transporting an autonomous agricultural vehicle and an operator-driven agricultural vehicle from a first agricultural work site to a second agricultural work site. For example, the autonomous agricultural vehicle may be towed behind the operator-driven agricultural vehicle such that the rear of the autonomous agricultural vehicle is facing a forward direction of movement of the operator-driven agricultural vehicle. This configuration may provide faster, more efficient, and/or more practical coupling of the autonomous agricultural vehicle to the operator-driven agricultural vehicle. For example, this configuration may not require removal or significant alterations to any implements attached to the front of the autonomous agricultural vehicle.

The disclosed methods and system may also provide for more efficient coupling of the autonomous agricultural vehicle to the operator-driven agricultural vehicle through various autonomous features of the autonomous agricultural vehicle. Additionally, the respective electrical systems and/or hydraulic systems of the autonomous agricultural vehicle and operator-driven agricultural vehicle may be connected such that the operator may control various functions of the autonomous agricultural vehicle while driving the operator-driven agricultural vehicle.

It should be appreciated that, although the disclosed systems and methods will be described primarily with references to harvesters, they may be applicable to any suitable agricultural vehicles, including, for example planters, tillers and the like.

Figure 1:
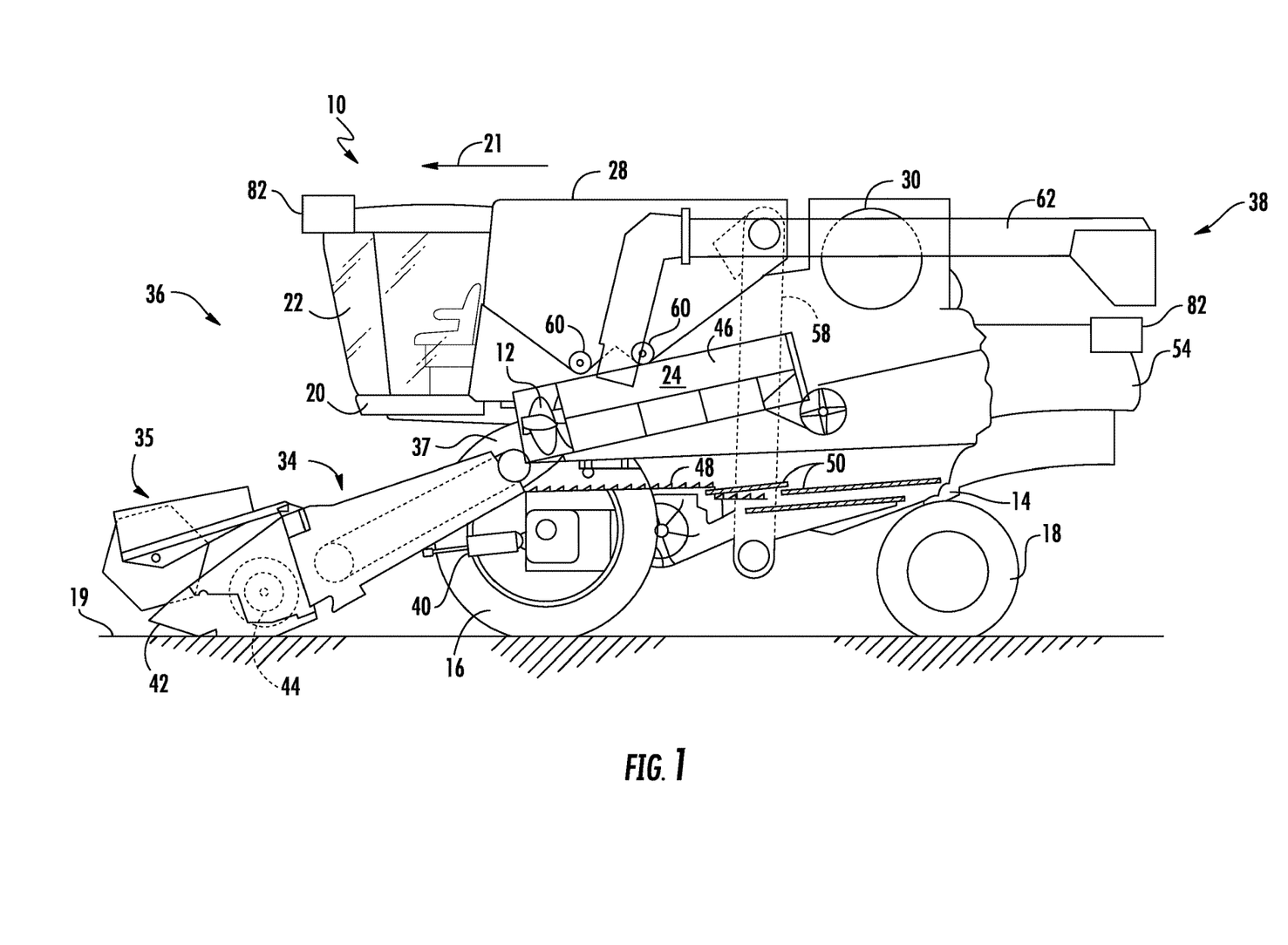
FIG. 1 illustrates a side view of one embodiment of an operator-driven agricultural vehicle, such as a harvester, in accordance with aspects of the present subject matter.

Referring now to the drawings, FIG. 1 illustrates a simplified, partial sectional side view of one embodiment of an operator-driven agricultural vehicle 10 (e.g., a harvester). The operator-driven agricultural vehicle 10 may be configured as an axial-flow type combine, wherein crop material is threshed and separated while it is advanced by and along a longitudinally arranged rotor 12. The operator-driven harvester 10 may include a chassis or main frame 14 having a pair of driven, ground-engaging front wheels 16 and a pair of steerable rear wheels 18. The wheels 16, 18 may be configured to support the operator-driven harvester 10 relative to the ground surface 19 and move the operator-driven harvester 10 in a forward direction of movement 21 relative to the ground surface 19. Additionally, an operator's platform 20 with an operator's cab 22, a threshing and separating assembly 24, a grain cleaning assembly 26 and a holding tank 28 are supported by the frame 14. Additionally, as is generally understood, the operator-driven harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured for generally vertical movement to a front end 36 of the harvester 10, which faces the forward direction 21 of movement of the operator-driven harvester 10 and is opposite a rear end 38 of the operator-driven harvester 10. In general, the feeder 34 may be configured to serve as support structure for the header 32. As shown in FIG. 1, the feeder 34 may extend between a front end 35 coupled to the header 32 and a rear end 37 positioned adjacent to the threshing and separating assembly 24. As is generally understood, the rear end 37 of the feeder 34 may be pivotally coupled to a portion of the operator-driven harvester 10 to allow the front end 35 of the feeder 34 and, thus, the header 32 to be moved upwardly and downwardly relative to the ground 19 to set the desired harvesting or cutting height for the header 32. For instance, as shown in FIG. 1, one or more height control cylinders 40 may be coupled to the feeder 34 to allow the header 32 to be raised and lowered relative to the ground 19.

As the operator-driven harvester 10 is propelled forwardly over a field with standing crop, the crop material is severed from the stubble by a sickle bar 42 at the front of the header 32 and delivered by a header auger 44 to the front end 35 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the operator-driven harvester 10 through the outlet of a straw hood 54 positioned at the back end of the operator-driven harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube for discharge from the operator-driven harvester 10.

Figure 2:
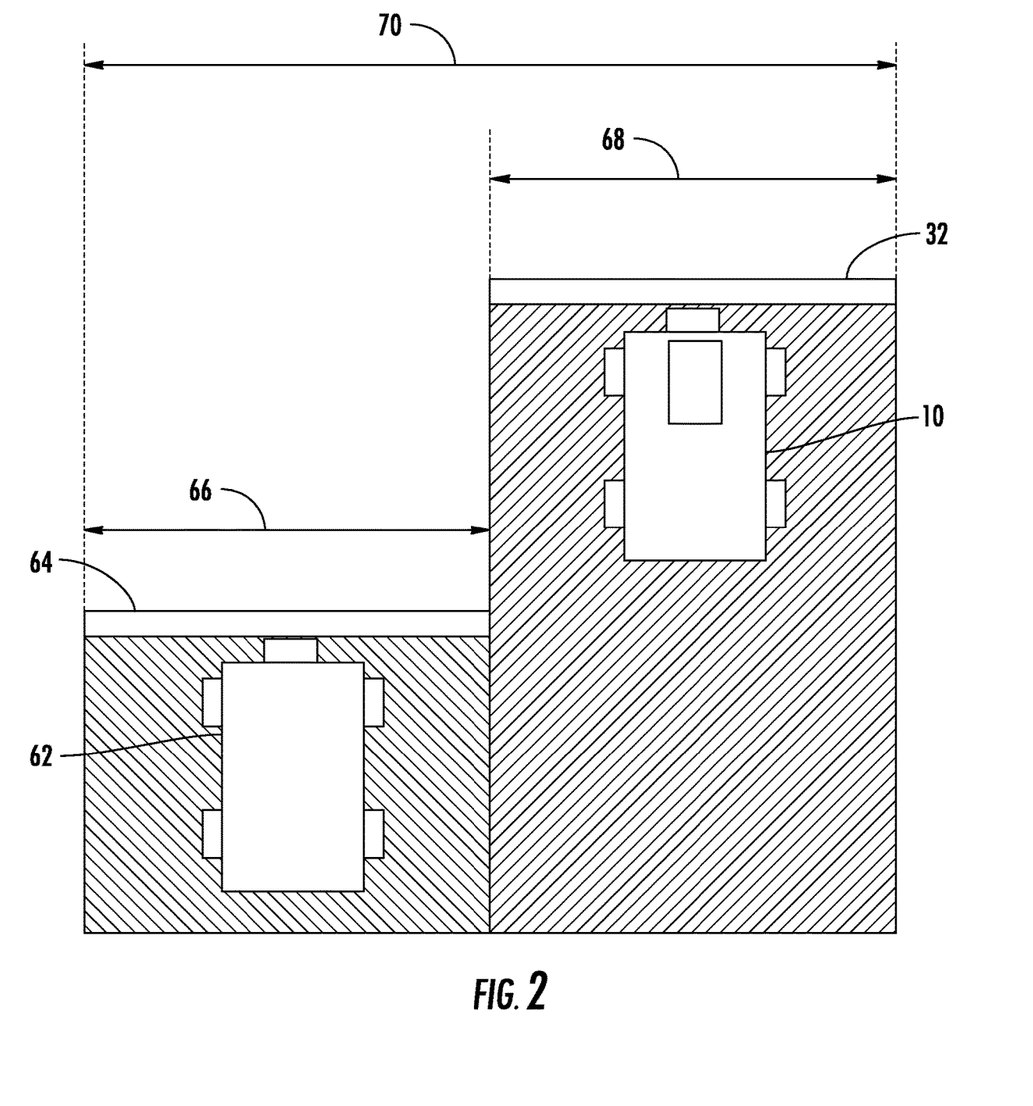
FIG. 2 illustrates a schematic view of an operator-driven agricultural vehicle and an autonomous agricultural vehicle performing an agricultural operation in accordance with aspects of the present subject matter.

Referring now to FIG. 2, an autonomous agricultural vehicle ("AAV") 62 may be configured to assist or perform any suitable agricultural operation with an operator-driven agricultural vehicle ("ODAV") 10. Examples of agricultural operations include harvesting, planting, tilling and/or the like. For example, in some embodiments, the ODAV 10 may be an operator-driven harvester, as described above. In some embodiments, the AAV 62 may be an autonomous harvester and may include a header 64 configured to be moved upwardly and downwardly relative to the ground 19 to set the desired harvesting or cutting height for the header 64. In some embodiments, the AAV 62 may align itself such that it performs the agricultural operation across a coverage width 66 directly adjacent a coverage width 68 of the ODAV 10. Thus, in one pass across the agricultural work site, the harvesters 10, 62 may cover a combined width 70, which is the sum of the coverage width 68 of the ODAV 10 and the coverage width 66 of the AAV 62. In other embodiments, the AAV 62 may tow a mobile storage compartment alongside the ODAV 10 during the agricultural operation to collect an agricultural product or waste.

After completing the agricultural operation, the operator may wish to transport both vehicles 10, 62 from their current location in a first agricultural work site to a second agricultural work site, which may involve driving on public roads or highways. As indicated above, operating autonomous vehicles on public roads may be heavily regulated in some regions, and may be completely prohibited in others. While towing the AAV 62 to the second agricultural work site, it may be desirable for the operator to control various functions of the AAV 62, including for example, illuminating indicator lights, such as brake and turn signal lights, steering the AAV 62, and/or the like. Additionally, a front-mounted implement, such as the header 64 of the AAV 62, may make towing the AAV 62 in a forward-facing orientation difficult or impractical.

Figure 3:
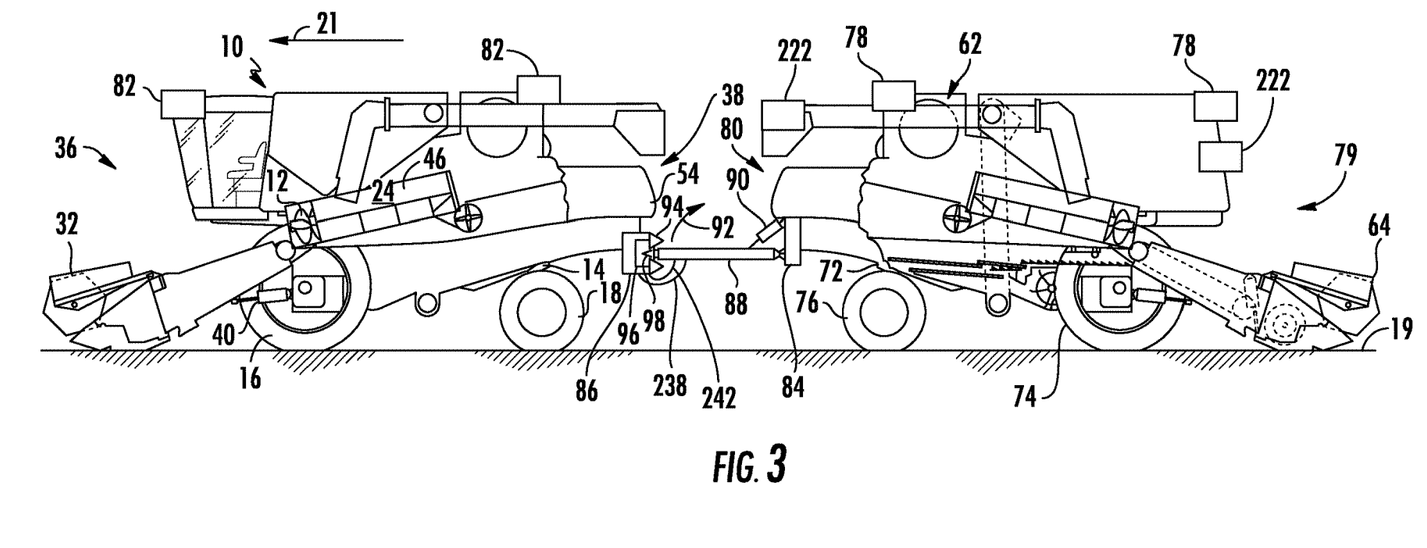
FIG. 3 illustrates a side view of an operator-driven agricultural vehicle coupled with an autonomous agricultural vehicle for towing in accordance with aspects of the present subject matter.

Referring to FIG. 3, the AAV 62 may be an autonomous harvester and include similar components as the operator-driven harvester 10 described with reference to FIG. 1. The AAV 62 may include a chassis or main frame 72 having a pair of driven, ground-engaging front wheels 74 and a pair of steerable rear wheels 76 configured to support the AAV 62 relative to the ground surface 19.

The AAV 62 may also include a set of indicator lights 78. For example, the AAV 62 may include one or more turn signal lights, brake lights, caution lights, and/or the like. For example, one or more indicator lights 78 may be disposed along a front end 79 and/or a rear end 80 of the AAV 62. Similarly, the ODAV 10 may also have one or more indicator lights 82, which may include one or more turn signal lights, brake lights, caution lights, and/or the like. The indicator lights 82 may be disposed along the front end 36 and/or the rear end 38 of the ODAV 10.

Still referring to FIG. 3, the ODAV 10 and the AAV 62 may be equipped with respective hitch assemblies such that the AAV 62 may be towed behind the ODAV 10. In one embodiment, one of the vehicles may be equipped with an actuating hitch assembly 84, and the other may be equipped with a receiving hitch assembly 86. For example, as shown in FIG. 3, in some embodiments, the actuating hitch assembly 84 may be attached to the rear end 80 of the AAV 62, and the receiving hitch assembly 86 may be attached to the rear end 38 of the ODAV 10. In other embodiments, however, the configuration may be reversed such that the ODAV 10 may include the actuating hitch assembly 84, while the AAV 62 may include the receiving hitch assembly 86.

The actuating hitch assembly 84 may include a hitch arm 88 and an associated hitch actuator 90. The hitch arm 88 may be pivotally mounted to the actuating hitch assembly 84 such that the hitch actuator 90 may raise (as illustrated by arrow 92) and lower it from a deployed position as shown in FIG. 3, to a retracted position. For example, in the retracted position, the hitch arm 88 may be generally vertical. In other embodiments the hitch arm may include one or more pivots or joints along its length which may be mechanically connected such that the hitch arm folds up into the retracted position and unfolds to the deployed position.

The receiving hitch assembly 86 may include one or more guides 94 surrounding a locking mechanism 96. The guides 94 may aid a tip 98 of the hitch arm 88 towards the locking mechanism 96 to facilitate connection of the vehicles 10, 62. The guides 94 may generally include a pair of surfaces sloping inward toward the locking mechanism 96, and may have any suitable configuration.

The locking mechanism 96 may be configured as any suitable type of locking mechanism. For example, the locking mechanism 96 may be configured as a spring-loaded latch, and the tip 98 of the hitch arm may include a protrusion, which may generally have a spherical or cylindrical shape, for example. Once the protrusion is pushed against the spring-loaded latch, the protrusion may force the spring-latch open. After the protrusion has passed into spring-loaded latch, a spring may force the spring-loaded latch shut, preventing the protrusion from escaping the latch.

In other embodiments, the hitch arm 88 may include a pin having a circumferential groove, and the locking mechanism 96 may include a hole sized to receive the pin. Within the hole, the locking mechanism 96 may include any suitable mechanism for securing the pin. For example, the locking mechanism 96 may include a spring loaded latch or a ratcheting device configured to engage the circumferential groove of the pin.

Figure 4A:
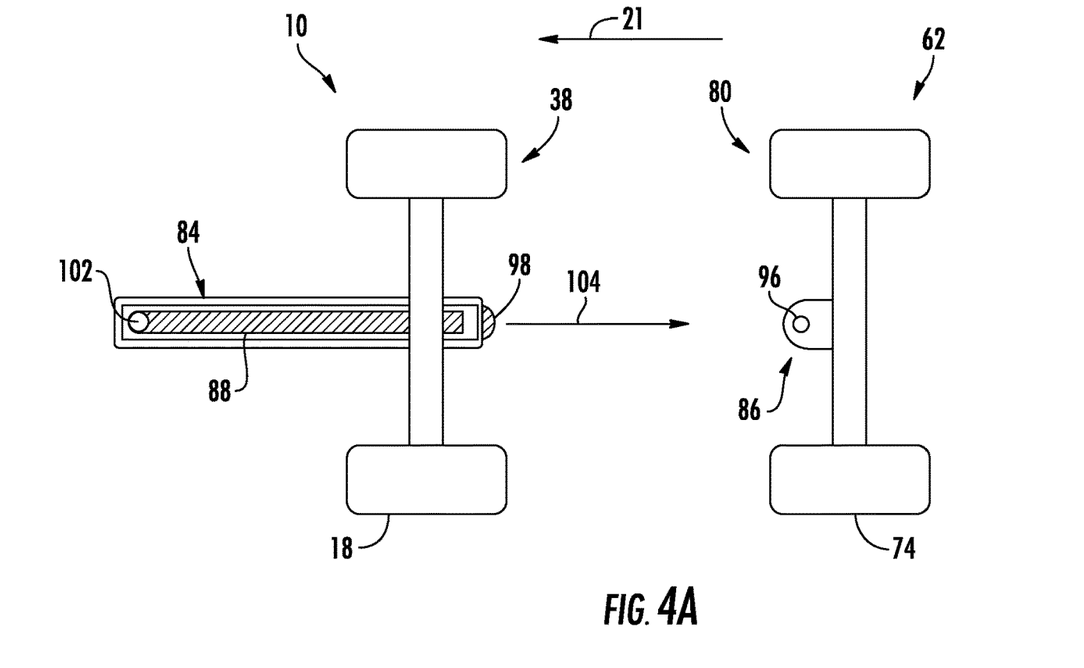
FIGS. 4a and 4b illustrate top-down views of one embodiment of an actuating hitch assembly in a retracted position and extended position, respectively, in accordance with aspects of the present subject matter.
Figure 4B:
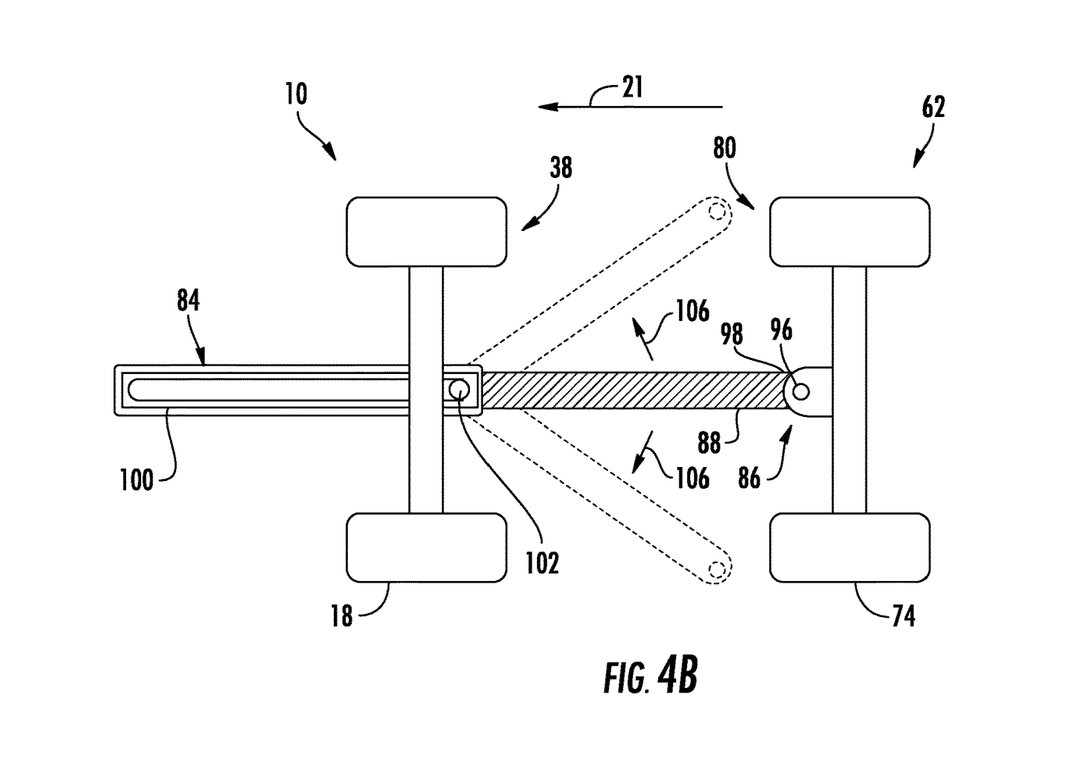

Referring to FIGS. 4a and 4b, as indicated above, in some embodiments, the actuating hitch assembly 84 may be attached to the rear end 38 of the ODAV 10, and the receiving hitch assembly 86 may be attached to the rear end 80 of AAV 62. Additionally, in some embodiments, the actuating hitch assembly 84 may have a telescoping configuration. For example, the hitch arm 88 may telescope from the retracted position, shown in FIG. 4a, to the extended position, shown in FIG. 4b. As depicted in FIG. 4a, the actuating hitch assembly 84 may include a slotted track 100, and the hitch arm 88 may include a cylindrical boss, or peg 102, protruding vertically from a top surface of the hitch arm 88. The hitch arm 88 may be slidably received within the slotted track 100, and the peg 102 of the hitch arm 88 may be disposed within the slot of the slotted track 100. As shown in FIG. 4a, the hitch arm 88 may be configured to telescope toward the receiving hitch assembly 86 in the horizontal direction and opposite the forward travel direction 21 of the ODAV 10 (as illustrated by arrow 104). In the extended position, the hitch arm 88 may be configured to pivot about the peg 102 (as illustrated by arrows 106 in FIG.

4b). The tip 98 of the hitch arm 88 may be configured to connect with the locking mechanism 96 of the receiving hitch assembly 86 attached with the rear end 80 of the AAV 62. The connection between the tip 98 of the hitch arm 88 and the locking mechanism 96 may similarly allow the hitch arm to pivot with respect to the AAV 62. The tip 98 of the hitch arm 88 may be configured to connect with the locking mechanism 96 in any suitable manner, for example, using a spring-loaded latch as described above with reference to FIG. 3. In some embodiments, the locking mechanism 96 may be configured to lock on to the peg 102 of the hitch arm 88, for example.

Figure 5:
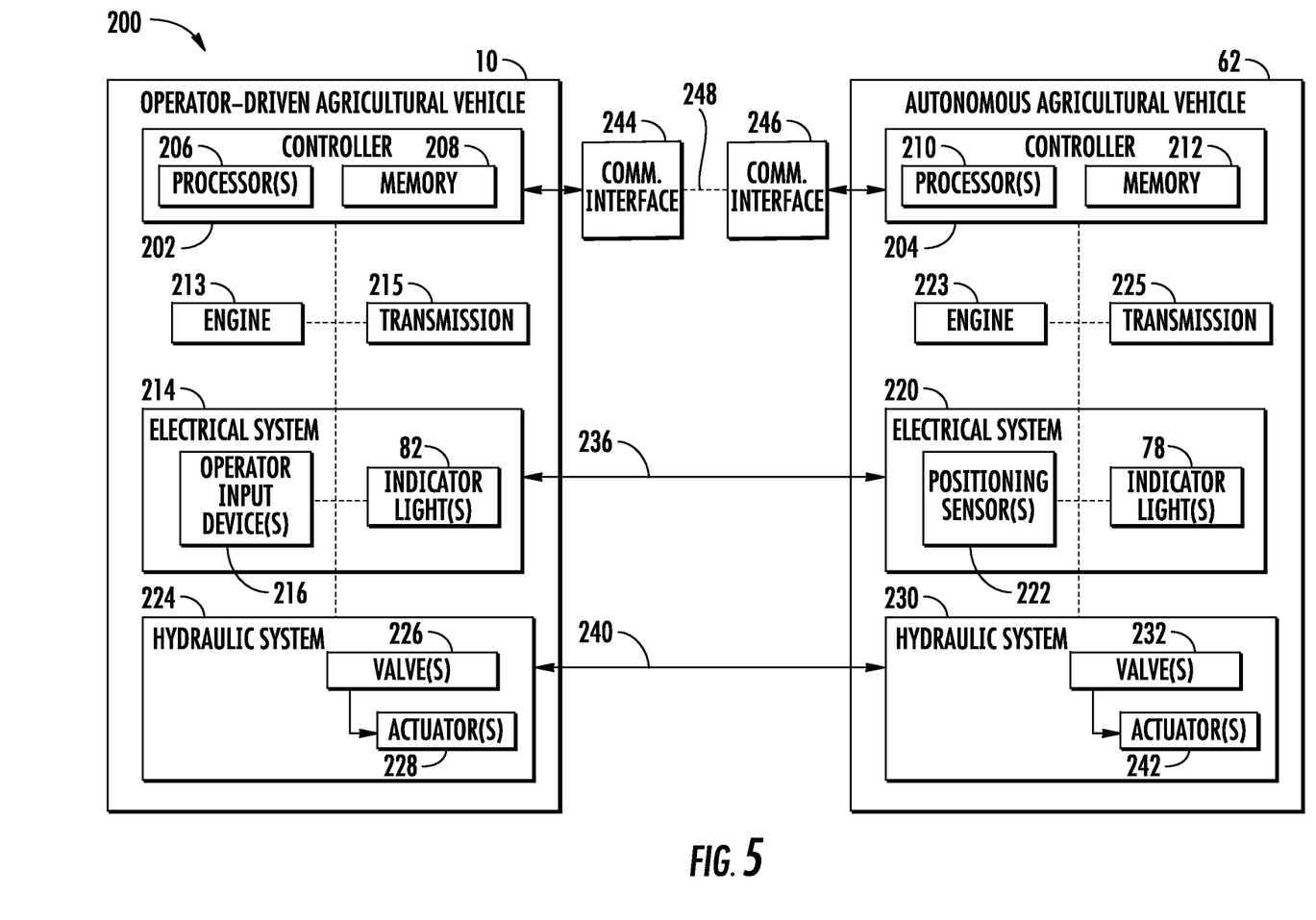
FIG. 5 illustrates a schematic view of one embodiment of a system for transporting an autonomous agricultural vehicle in accordance with aspects of the present subject matter.

Referring now to FIG. 5, a schematic view of one embodiment of a system 200 for transporting the AAV 62 and the ODAV 10 from a first agricultural work site to a second agricultural work site is illustrated in accordance with aspects of the present subject matter. Although described with reference to embodiments of the AAV 62 and ODAV 10 described above, the following description of the system 200 is applicable to any suitable autonomous agricultural vehicle and operator-driven agricultural vehicle. As shown, the system 200 may generally include an ODAV controller 202 installed on and/or otherwise provided in operative association with the ODAV 10 and an AAV controller 204 installed on and/or otherwise provided in operative association with the AAV 62. In general, each controller 202, 204 of the disclosed system 200 may correspond to any suitable processor-based device(s), such as a computing device or any combination of computing devices. Thus, in several embodiments, the ODAV controller 202 may include one or more processor(s) 206 and associated memory device(s) 208 configured to perform a variety of computer-implemented functions. Similarly, as shown in FIG. 3, the AAV controller 204 may also include one or more processor(s) 210 and associated memory devices 212 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208, 212 of each controller 202, 204 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208, 212 may generally be configured to store suitable computer-readable instructions that, when implemented by the processor(s) 206, 210, configure each controller 202, 204 to perform various computer-implemented functions, such as one or more aspects of one or both of the methods 300, 400 described below with reference to FIGS. 6 and 7.

In addition, each controller 202, 204 may also include various other suitable components, such as a communications circuit or module, a network interface, one or more input/output channels, a data/control bus and/or the like, to allow each controller 202, 204 to be communicatively coupled to the other controller and/or to any of the various other system components described herein. The ODAV controller 202 may be configured to monitor and/or control an engine 213 and/or transmission 215 of the ODAV 10.

In some embodiments, the ODAV 10 may include an electrical system 214, and the ODAV controller 10 may be communicatively coupled with the electrical system 214. The electrical system 214 may have one or more operator input devices 216 communicatively coupled with the ODAV controller 202. For example, the operator input devices 216 may include a steering system having a steering input device, such as a steering wheel, configured to receive a steering input from the operator. The operator input devices may also include a throttle control (e.g., a gas pedal), and/or a braking input (e.g., a brake pedal) and the like. Similarly, the operator input devices 216 may include a switch or lever to illuminate various indicator lights 82, such as turn signals and/or brake lights.

In some embodiments, the operator input devices 216 may also include a user interface configured to allow the operator to transmit instructions and/or operating parameters from the ODAV controller 202 to the AAV controller 204. For example, the operator may transmit a request to the AAV controller 204 for the AAV controller 204 to initiate an agricultural operation, such as following and harvesting alongside the ODAV 10. In other embodiments, the ODAV 10 may transmit a request for the AAV 62 to tow a mobile storage compartment alongside the ODAV 10 to collect agricultural product or waste, for example.

The AAV 62 may similarly include an electrical system 220 connected with the indicator lights 78 of the AAV 62. In some embodiments, the indicator lights 78 of the AAV 62 may include one or more brake lights and/or turn signal lights attached to or disposed adjacent the front end 79 of the AAV 62 such that, when the AAV 62 is being towed with the rear end 80 of the AAV 62 facing the forward travel direction 21 of the ODAV 10, such lights are visible to vehicles behind the AAV 62.

The electrical system 220 of the AAV 62 may include various positioning sensors 222 for monitoring a position of the AAV 62 relative to the ODAV 10. For example, the AAV 62 may include a global position system (GPS) and/or one or more vision sensors (e.g., one or more cameras, radar devices, LIDAR devices, and/or the like).

The AAV controller 204 may be communicatively coupled with the various positioning sensors 222 and configured to determine a current position, orientation, and/or heading of AAV 62 based on signals received from the positioning sensors 222. The AAV controller 204 may also be configured to control an engine 223 and transmission 225 of the AAV 62 to control the movement of the AAV 62 relative to the ground 19 and perform or assist the ODAV 10 in agricultural operations.

Additionally, the ODAV 10 may include a hydraulic system 224 having one or more control valves 226 configured to regulate the supply of fluid (e.g., hydraulic fluid or air) to one or more of actuators associated 228 with the ODAV 10. For example, the control valves 226 may include a brake control valve configured to regulate the supply of fluid to a brake actuator associated with one or more of the wheels 16, 18 of the ODAV 10. The control valves 226 may also include a height control valve configured to control the flow height control cylinders 40 which control the height of the header 32. The control valves 226 may also include a steering control valve which is associated with a steering actuator configured to steer at least one wheel of the ODAV 10.

The AAV 62 may similarly include a hydraulic system 230 having one or more control valves 232 and associated actuators 234 configured to regulate the supply of fluid (e.g., hydraulic fluid or air) to the one or more of actuators. For example, one or more of the control valves 232 may be configured to regulate the supply of fluid (e.g., hydraulic fluid or air) to respective associated actuators 234, such as a brake actuator configured to apply a braking force to one or more the wheels 74, 76 of the AAV 62, height control cylinders for the header, and/or one or more steering cylinders configured to steer one or more of the wheels 74, 76 of the AAV. Additionally, the control valves 232 may include a hitch control valve configured to control the flow of fluid to the hitch actuator 90 of the actuating hitch assembly 84. As indicated above, in other embodiments, the actuating hitch assembly 84 may instead be attached to the ODAV 10. In such embodiments, the ODAV hydraulic system 224 may include a hitch control valve configured to control the flow of fluid to the hitch actuator 90 of the actuating hitch assembly 84.

The system 200 may also include one or more electrical connections 236 for directly connecting the electrical system 214 of the ODAV 10 with the electrical system 220 of the AAV 62. For example, referring back to FIG. 3, the hitch arm 88 may have one or more electrical cables 238 attached to an outer surface of the hitch arm 88. The electrical cable(s) 238 may include one or more internal electrical wires, and one or more connectors. The connector(s) may be configured to connect the electrical cable(s) with an electrical port on the ODAV such that the electrical wire(s) connect the AAV electrical system 220 with the ODAV electrical system 214 as described in greater detail below. Referring again to FIG. 5, for example, the electrical connection 236 may be configured such that the indicator lights 82 of the ODAV 10 are connected with equivalent respective indicator lights 78 of the AAV 62. For instance, the electrical leads of the ODAV brake lights may be connected with the electrical leads of the AAV brake lights such that when the electrical system 214 of the ODAV 10 illuminates the brake lights of the ODAV 10, the brake lights of the AAV 62 are similarly illuminated. Similarly, the turn signal lights of the ODAV 10, for example, may be electrically coupled with the turn signal lights of the AAV 62 such that illuminating left turn signal indicator light(s) of the ODAV 10 transmits an electrical signal from the electrical system 214 of the ODAV 10 to the electrical system 220 of the AAV 62 to illuminate the appropriate turn signal indicator light of the AAV 62. As indicated above, the ODAV 10 may be configured to tow the AAV 62 such that the rear end 80 of the AAV 62 faces the forward direction 21 of movement of the ODAV 10. Accordingly, the electrical connection 236 may be configured such that illuminating the left turn signal indicator light(s) of the ODAV 10 results in the turn signal lights disposed on the front end 79 (which is facing rearward) of the AAV 62 being illuminated. For example, the electrical connection may be configured to illuminate lights on the right side of the AAV 62, which are on the left with respect to a vehicle driving behind the AAV 62 when the AAV 62 is being towed facing rearward.

Still referring to FIG. 5, the system 200 may also include one or more hydraulic connections 240 for directly connecting the hydraulic system 224 of the ODAV 10 with the hydraulic system 230 of the AAV 62. For example, referring back to FIG. 3, the hitch arm 88 may have one or more hydraulic lines 242 attached to an outer surface of the hitch arm 88. The hydraulic lines 242 may be coupled together within a sleeve and the hydraulic connection 240 may include one or more connectors. The connector(s) may be configured to connect the hydraulic lines 242 with one or more hydraulic port(s) on the ODAV 10 which, in turn, are connected with the hydraulic system 224 of the ODAV 10.

Referring to FIG. 5, the hydraulic connection 240 may be configured to connect actuators 228 and/or control valves 226 of the ODAV 10 directly with equivalent respective actuators 234 and/or control valves 232 of the AAV 62. For example, the hydraulic connection 240 may be configured to directly fluidly connect one or more of the steering actuator, the brake actuator, and/or the emergency brake actuator of the ODAV 10 with the respective equivalent actuators 234 of the AAV 62. For example, the hydraulic connection 240 may directly fluidly connect the steering actuator of the ODAV 10 with the steering actuator of the AAV 62. For example, when the operator controls the hydraulic system 224 of the ODAV 10 by providing an operator steeling input to one or more operator input device(s) 216, such as a steering wheel of the ODAV 10, the hydraulic fluid actuates the steering actuator to steer the wheel(s) associated with the ODAV 10. This operator input may simultaneously steer the AAV 62. Similarly, if the operator applies the brake of the ODAV 10, the brake of the AAV 62 may similarly be applied through the hydraulic connection 240 in a similar manner as described above.

As indicated above, in some embodiments, the AAV 62 may be generally arranged such that the rear end 80 of the AAV 62 faces the forward direction 21 of movement of the ODAV 10. To accommodate this configuration, in some embodiments, the hydraulic connection 240 may be appropriately configured such that a left steering action at the ODAV 10 causes a right steering action at the AAV 62 to account for the orientation of the AAV 62 with respect to the forward direction 21 of movement and visa versa.

In addition, or as an alternative to the electrical and hydraulic connections 236, 240 described above, in some embodiments, the ODAV controller 202 may send requests to the AAV controller 204 to control the electrical system 220 and/or hydraulic system 230 of the AAV 62 to perform the various functions described above when the AAV 62 is being towed behind the ODAV 10. The system 200 may include a connection between the ODAV and AAV controllers 202, 204, which may be wireless or hard wired. For example, in some embodiments, each of the ODAV and AAV controllers 202, 204, may include respective wireless communication interfaces 244, 246 which are configured to establish a wireless connection 248 therebetween. The wireless communication interfaces 244, 246 may be configured to transmit and/or receive data via any suitable network, such as a local wireless network using any suitable wireless communications protocol (e.g., WiFi, Bluetooth, and/or the like) and/or a broader network, such as a wide-area network (WAN), using any suitable communications protocol (e.g., TCP/IP, HTTP, SMTP, FTP). In other embodiments, the electrical connection 236 may be configured to connect the controllers 202, 204 instead of directly connecting the various electrical components of the ODAV 10 and AAV 62 described above.

For example, in some embodiments, the ODAV controller 202 may detect operator inputs from the various operator input device(s) 216 associated with braking, steering, and/or illuminating indicator lights 82 and the like. The ODAV controller 202 may then send a request to the AAV controller 204 to perform the same function. For example, if the operator of the ODAV 10 illuminates the left turn signal, the ODAV controller 202 may send a signal to the AAV controller 204 requesting that the AAV 62 similarly indicate a left turn using the appropriate indicator light(s) 78. As noted above with respect to steering, the AAV 62 may be towed in a backwards orientation with respect to the forward direction 21 of movement of the ODAV 10. Thus the controller(s) may correct for this such that the appropriate signal light on the AAV 62 is illuminated corresponding to the turn direction. Similarly, in response to steering input from the operator the ODAV controller 202 may send a request to the AAV controller 204 to steer the AAV 62 accordingly. For example, when the operator steers left, the control AAV controller 204 may control the steering actuator 242 using one or more control valves 232 to appropriately steer the AAV 62.

Figure 6:
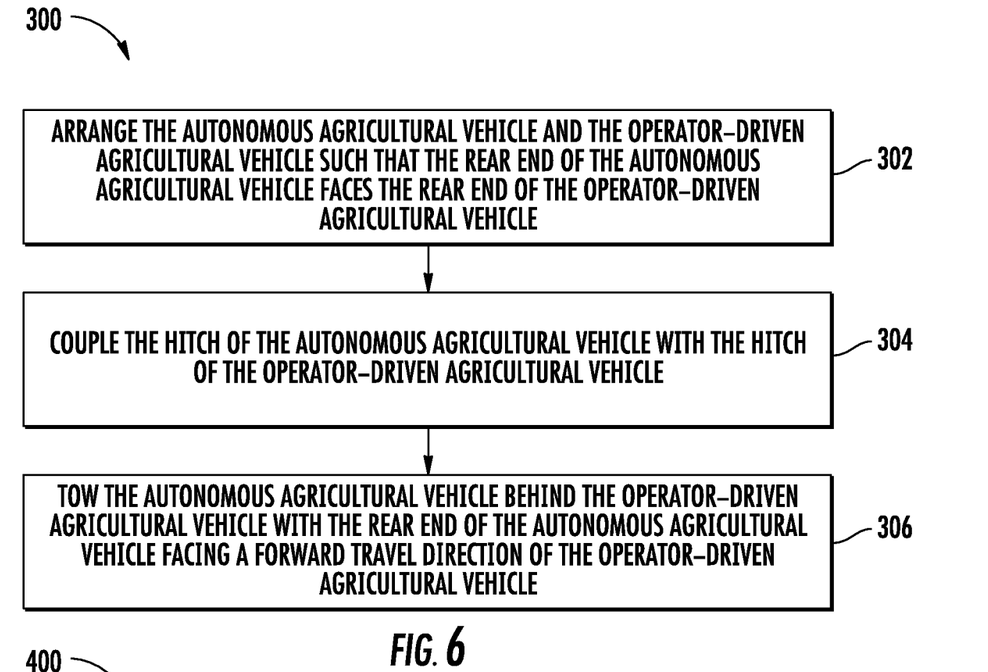
FIG. 6 illustrates a flow diagram showing one embodiment of a method for transporting an autonomous agricultural vehicle in accordance with aspects of the present subject matter.
Figure 7:
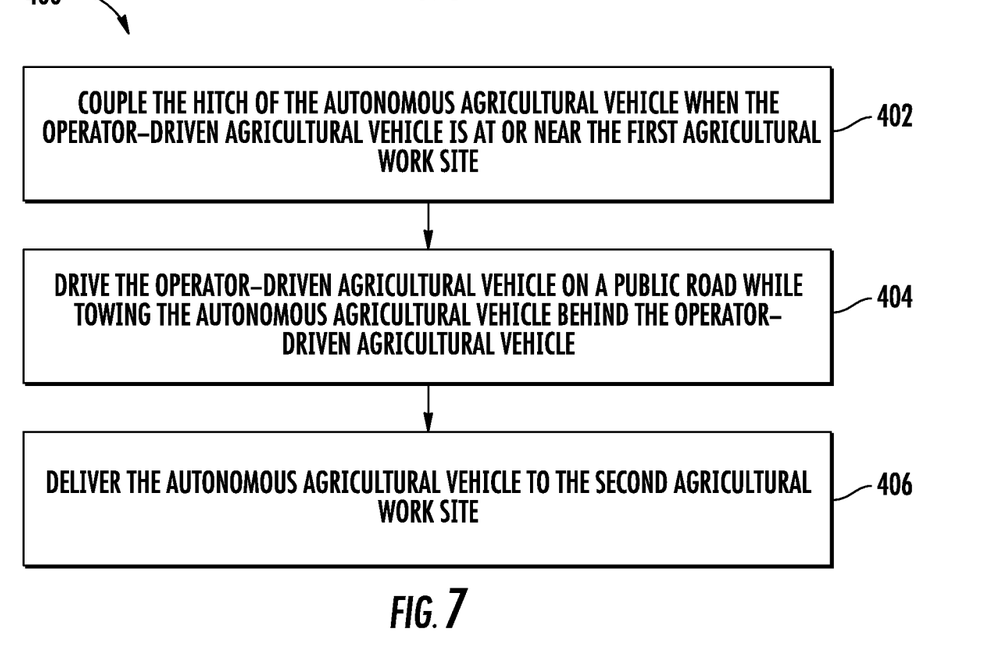
FIG. 7 illustrates a flow diagram showing another embodiment of a method for transporting an autonomous agricultural vehicle in accordance with aspects of the present subject matter.

FIG. 6 illustrates a flow diagram of one embodiment of a method 300 for transporting an AAV 62 from a first agricultural work site to a second agricultural work site in accordance with aspects of the present subject matter. Additionally, FIG. 7 illustrates another embodiment of a method 400 for transporting an AAV 62 from a first agricultural work site to a second agricultural work site in accordance with aspects of the present subject matter. In one embodiment, the method 400 shown in FIG. 7 may form a portion of the method 300 shown in FIG. 6 and/or may represent a specific implementation of the method 300 shown in FIG. 6. Although FIGS. 6 and 7 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 6, the method 300 may include, at (302) arranging the AAV 62 and the ODAV 10 such that the rear end 80 of the AAV 62 faces the rear end 38 of the ODAV 10. For example, in one embodiment, after completion of an agricultural operation at a first agricultural work site, the operator of the ODAV 10 may instruct the AAV 62 to enter a stand-by mode such that the AAV 62 ceases the agricultural operation and remains stationary. For example, the operator may use the user interface (one of the operator input devices 216), to instruct the ODAV controller 202 to send the request to the AAV controller 204 through the wireless connection 248 between the wireless communication interfaces 244, 246.

The operator may then manually drive the ODAV 10 to arrange the ODAV 10 such that the rear end 38 of the ODAV 10 faces the rear end 80 of the AAV 62. In some embodiments, the operator may visually determine the distance between the actuating hitch assembly 84 and receiving hitch assembly 86, and move the ODAV 10 until it is within an acceptable predetermined distance range such that the actuating hitch assembly 84 may be coupled with the receiving hitch assembly 86. In other embodiments, the operator may instruct the AAV 62 to automatically arrange itself into position for coupling with the ODAV 10. For example, the AAV controller 204 may automatically control the movement of the AAV 62 relative to the ground 19 and the ODAV 10. Referring back to FIG. 5, the AAV controller 204 may communicate with one or more positioning sensor(s) 222 (e.g., GPS, one or more vision sensors, proximity sensors, and/or the like) to sense and determine the relative position and/or orientation of the AAV 62 with respect to the ODAV 10. The AAV 62 may also determine a path from its current position and/or orientation to the desired position and/or orientation for hitching to the ODAV 10. For example, the AAV controller 204 may control the engine 223 and transmission 225 of the AAV 62 to drive forward, shift gears, and/or drive in reverse to arrange the AAV 62 in position for coupling to the ODAV 10. During this procedure, the AAV controller 204 may similarly control the hydraulic system 224 to steer and/or brake the AAV 62.

In some embodiments, the AAV controller 204 may automatically sense a distance between the actuating hitch assembly 84 of the AAV 62 and the receiving hitch assembly 86 of the ODAV 10. For example, the AAV controller 204 may sense the distance using one or more of the positioning sensors 222, which may include vision sensors (e.g., one or more cameras, radar devices, LIDAR devices, and/or the like) disposed adjacent the rear end 80 of the AAV 62. The AAV controller 204 may then automatically move the AAV 62 relative to the ODAV 10 until the sensed distance is within a predetermined distance range such that the actuating hitch assembly 84 may be extended and automatically coupled with the receiving hitch assembly 86.

Referring still to FIG. 6, the method 300 may include, at (304), coupling the hitch of the AAV 62 with the hitch of the ODAV 10. For example, the operator may instruct the AAV controller 204 through an operator input device 216 (e.g., the user interface) of the ODAV 10 and wireless connection 248 between the wireless communication interfaces 244, 246, to deploy the hitch arm 88 of the actuating hitch assembly 84. In other embodiments, the AAV controller 204 may automatically deploy the actuating hitch assembly 84 of the AAV 62 when the AAV controller 204 senses it is appropriate. This may include automatically sensing with one or more of the positioning sensor(s) 222 whether the area between the actuating hitch assembly 84 and the receiving hitch assembly 86 is free of obstructions, such as people or equipment, for example. The AAV controller 204 may then automatically control the hitch control valve 232 to extend the hitch actuator 90 and, thus, extend the hitch arm 88. The AAV 62 and/or the ODAV 10 may also include one or more hitch status sensors configured to detect a status of the coupling between the actuating hitch assembly and the receiving hitch assembly. The hitch status sensor(s) may be any suitable sensor including, for example, a magnetic, radio frequency identification (RFID), potentiometer, and/or visual sensor.

As indicated above, in some embodiments, the hitch arm 88 may be configured to extend horizontally to connect with the receiving hitch assembly 86, for example as a telescoping arm. The actuating hitch assembly 84 may be configured to deploy the hitch arm 88 according to the sensed distance between the actuating hitch assembly 84 and the receiving hitch assembly 86. In some embodiments, the sensed distance may be less than the length of the fully extended hitch arm 88. For example, the hitch arm 88 may be extended until the hitch arm 88 is coupled with the receiving hitch assembly 86, which may be less than the fully extended length of the hitch arm 88. Then, once the ODAV 10 begins towing the AAV 62, the hitch arm 88 may fully extend.

As noted above, in some embodiments, the actuating hitch assembly 84 may instead be attached to the rear end 38 of the ODAV 10 and the receiving hitch assembly 86 may be attached to the rear end 80 of the AAV 62. In such an embodiment, the AAV 62 may transmit a signal through the wireless connection 248 to the ODAV controller 202 indicating that the AAV 62 is in position and ready to be coupled with the ODAV 10. The ODAV 10 may then automatically deploy the actuating hitch assembly 84 in the manner described above.

In some embodiments, the operator may manually couple the respective hitches of the vehicles 10, 62. For example, the operator may manually pivot or extend the hitch arm 88 from the retracted position to the extended position. In some embodiments, the operator may manually lock the locking mechanism 96 with the tip 98 of the hitch arm 88 by, for example, inserting a pin through respective receiving holes in the locking mechanism 96 and tip 98 of the hitch arm 88. The hitches may be configured as any type of hitch suitable for coupling agricultural vehicles, however. For example, in some embodiments, the hitch arm 88 may be detachable from each hitch and may be stored separately, for example on the ODAV 10 or the AAV 62. In some embodiments, the operator may manually carry the hitch arm 88 to the rear end 38 of the ODAV 10 and connect the hitch arm 88 to each respective hitch to couple the hitches of the vehicles 10, 62.

In some embodiments, the method 300 may also include connecting the hydraulic system 230 of the AAV 62 with the hydraulic system 224 of the ODAV 10 to form the hydraulic connection 240 described above. Additionally, in some embodiments, the method 300 may also include connecting the AAV electrical system 220 with the ODAV electrical system 214 to form the electrical connection 236 described above. For example, in one embodiment, the operator may manually connect one or more connectors associated with the hydraulic connection 240 and/or electrical connection 236 to the receiving hitch assembly 86, as described above.

In some embodiments, however, the actuating hitch assembly 84 may be configured to automatically form the hydraulic and/or electrical connections 236, 240. For example, the hydraulic line 242 of the hydraulic connection 240 and/or the electrical cable 238 of the electrical connection 236 may be disposed within the hitch arm 88, and the respective connector(s) may be disposed at the tip 98 of the hitch arm 88. Additionally, the electrical and/or hydraulic ports of the receiving hitch assembly 86 may be disposed adjacent the locking mechanism 96 such that coupling the tip 98 of the hitch arm 88 with the receiving hitch assembly 86 may also establish the hydraulic and/or electrical connection(s) 236, 240.

In some embodiments, the system 200 may include a safety feature preventing the AAV 62 from freely rolling into another vehicle or structure causing damage in the event that the AAV 62 becomes disconnected from the ODAV 10 while the ODAV 10 is towing the AAV 62. For example, the hydraulic connection 240 may include a pressurized fluid line fluidly connected with the parking brake of the AAV 62 when the ODAV 10 is towing the AAV 62. When connected, the pressurized fluid line may maintain the parking brake of the AAV 62 in a released condition such that the AAV 62 is free to roll relative to the around surface. Additionally, the connector(s) associated with the hydraulic connection 240 may be configured as a breakaway hydraulic coupler(s) configured to decouple under a predetermined tension threshold on the associated hydraulic line 242. For example, if the hitch assembly 84 of the AAV 62 unintentionally became de-coupled from the hitch assembly 86 of the ODAV 10 while the ODAV 10 was towing the AAV 62, the breakaway hydraulic coupler(s) may be configured to automatically release which may then reduce the pressure in the pressurized fluid line such that the parking brake of the AAV 62 automatically engages and stops the movement of the AAV 62.

In some embodiments, before towing the AAV 62, the operator may transmit a request to the AAV controller 204 requesting that the AAV controller 204 enter a standby mode in which the AAV controller 204 may turn off the engine 223, shift the transmission 225 into neutral, and/or remove the parking brake AAV 62. In other embodiments, however, the AAV controller 204 may be configured to remain in an active mode during towing such that the AAV controller 204 may perform various functions in response to requests from the ODAV controller 202 and/or monitor various sensors, such as the positioning sensor(s) 222 or the hitch status sensors) described above. For example, in some embodiments, the AAV controller 204 may be configured to monitor the status of the connection between the hitch assembly 84 of the AAV 62 and the hitch assembly 86 of the ODAV 10 through one or more sensors associated with one or more of the hitch assemblies 84, 86.

In some embodiments, the AAV controller 204 may be configured to respond to the emergency de-coupling scenario described above. For example, the AAV controller 204 may be configured such that if the AAV 62 becomes de-coupled from the ODAV 10 as described above, the AAV 62 may take control of the movement of the AAV 62 and temporarily resume autonomous operation, including controlling one or more of the steering, engine 223, transmission 225, and/or brakes of the AAV 62 to safely bring the AAV 62 to a stop. For example, the AAV controller 204 may be configured to sense whether a vehicle is driving behind the AAV 62 at the time of the de-coupling, and in such a situation, the AAV controller 204 may avoid abruptly engaging the brake, which could cause a collision. Instead, in such a situation, the AAV controller 204 may be configured to sound an alarm, illuminate emergency lights, slow the forward movement of the AAV 62, pull the AAV 62 side of the road, and/or safely come to a complete stop.

Still referring to FIG. 6, the method 300 may include, at (306), towing the AAV 62 behind the ODAV 10 with the rear end 80 of the AAV 62 facing the forward travel direction 21 of the ODAV 10, for example, as illustrated in FIG. 3. This configuration may provide several advantages, including, for example, allowing faster and more practical coupling of the AAV 62 with the ODAV 10. Additionally, because the AAV 62 is towed in a rearward-facing orientation, implements attached to the front end 79 of the AAV 62 may not need to be removed or altered.

As indicated above, FIG. 7 illustrates a flow diagram of another embodiment of a method 400 for transporting an AAV 62 from a first agricultural work site to a second agricultural work site in accordance with aspects of the present subject matter. In one embodiment, the method 400 may be related to the method 300 illustrated in FIG. 6, such as by forming a part of the method 300 described above. Referring to FIG. 7, the method 400 may be used to transport the AAV 62 from a first agricultural work site to a second agricultural work site. For example, the method 400 may include, at (402) coupling the hitches at or near the first agricultural work site. The method 400 may then include, at (404) driving the ODAV 10 on a public road while towing the AAV 62 behind the ODAV 10. The method 400 may then include, at (406) delivering the AAV 62 to the second agricultural work site. Upon arrival, the operator may transmit a signal from the ODAV controller 202 to the AAV controller 204 to decouple the actuating hitch assembly 84 from the receiving hitch assembly 86. For example, the connector(s) of the hydraulic connection 240 and the electrical connection 236 may be configured to safely release at a predetermined tension such that retracting the hitch arm 88 may safely disconnect the connector(s) without the operator manually disconnecting the connector(s). In other embodiments, however, the operator may manually disconnect the connector(s) before de-coupling the actuating hitch assembly 84 from the receiving hitch assembly 86. De-coupling the hitch assemblies 84, 86 may be performed in substantially the same manner as coupling the hitch assemblies 84, 86 explained above. Once the hitch assemblies are decoupled, the AAV controller 204 may be automatically configured to arrange the AAV 62 relative to the ODAV 10 in preparation for performing a second agricultural operation at the second agricultural location. For example, the AAV controller 204 may arrange the AAV 62 using the positioning sensor(s) 222 as describe above with regard to arranging the AAV 62 for coupling to the ODAV 10. The ODAV 10 and AAV 62 may then perform the second agricultural operation at the second agricultural location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for transporting an autonomous agricultural vehicle using a separate operator-driven agricultural vehicle, each of the vehicles having respective front ends and rear ends, each of the respective rear ends including a respective hitch, the method comprising:
    arranging the autonomous agricultural vehicle and the operator-driven agricultural vehicle such that the rear end of the autonomous agricultural vehicle faces the rear end of the operator-driven agricultural vehicle;
    coupling the hitch of the autonomous agricultural vehicle with the hitch of the operator-driven agricultural vehicle; and
    towing the autonomous agricultural vehicle behind the operator-driven agricultural vehicle with the rear end of the autonomous agricultural vehicle facing a forward travel direction of the operator-driven agricultural vehicle;
    connecting an electrical system of the autonomous agricultural vehicle with an electrical system of the operator-driven agricultural vehicle to form an electrical connection; and
    transmitting an electrical signal from the electrical system of the autonomous vehicle to the electrical system of the operator-driven vehicle to control the operation of a component of the autonomous agricultural vehicle.

2. The method of claim 1, further including driving the operator-driven agricultural vehicle on a public road while towing the autonomous agricultural vehicle behind the operator-driven agricultural vehicle.

3. The method of claim 1, wherein controlling the operation of a component of the autonomous agricultural vehicle includes illuminating an indicator light of the autonomous vehicle.

4. The method of claim 1, further including sending a request from an operator-driven agricultural vehicle controller to an autonomous agricultural vehicle controller to control the operation of a component of the autonomous agricultural vehicle.

5. The method of claim 1, further comprising connecting a hydraulic system of the autonomous agricultural vehicle with a hydraulic system of the operator-driven agricultural vehicle to form a hydraulic connection.

6. The method of claim 5, further comprising controlling a hydraulic actuator associated with the hydraulic system of the autonomous agricultural vehicle from the operator-driven agricultural vehicle using the hydraulic connection.

7. The method of claim 6, wherein controlling the hydraulic actuator includes applying a brake of the autonomous agricultural vehicle based on an operator input received at the operator-driven agricultural vehicle.

8. The method of claim 6, wherein controlling the hydraulic actuator includes steering at least one wheel of the autonomous agricultural vehicle based on an operator input received at the operator-driven agricultural vehicle.

9. A method for transporting an autonomous agricultural vehicle using a separate operator-driven agricultural vehicle, each of the vehicles having respective front ends and rear ends, each of the respective rear ends including a respective hitch, the method comprising:
    arranging the autonomous agricultural vehicle and the operator-driven agricultural vehicle such that the rear end of the autonomous agricultural vehicle faces the rear end of the operator-driven agricultural vehicle;
    coupling the hitch of the autonomous agricultural vehicle with the hitch of the operator-driven agricultural vehicle; and
    towing the autonomous agricultural vehicle behind the operator-driven agricultural vehicle with the rear end of the autonomous agricultural vehicle facing a forward travel direction of the operator-driven agricultural vehicle;
    wherein arranging the autonomous agricultural vehicle and the operator-driven agricultural vehicle includes automatically controlling, with one or more computing devices, the movement of the autonomous agricultural vehicle relative to the operator-driven agricultural vehicle.

10. The method of claim 9, wherein arranging the autonomous agricultural vehicle and the operator-driven agricultural vehicle further includes sensing, with one or more computing devices, a position of the autonomous agricultural vehicle relative to the operator-driven agricultural vehicle.

11. A method for transporting an autonomous agricultural vehicle using a separate operator-driven agricultural vehicle, each of the vehicles having respective front ends and rear ends, each of the respective rear ends including a respective hitch, the method comprising:
    arranging the autonomous agricultural vehicle and the operator-driven agricultural vehicle such that the rear end of the autonomous agricultural vehicle faces the rear end of the operator-driven agricultural vehicle;
    coupling the hitch of the autonomous agricultural vehicle with the hitch of the operator-driven agricultural vehicle; and
    towing the autonomous agricultural vehicle behind the operator-driven agricultural vehicle with the rear end of the autonomous agricultural vehicle facing a forward travel direction of the operator-driven agricultural vehicle;
    wherein coupling the hitch of the autonomous agricultural vehicle with the hitch of the operator-driven agricultural vehicle includes automatically actuating, with one or more computing devices, at least one of the hitch of the autonomous agricultural vehicle or the hitch of the operator-driven agricultural vehicle.

12. The method of claim 11, wherein coupling the hitch includes automatically sensing, with one or more computing devices, a distance between the hitch of the autonomous agricultural vehicle and the hitch of the operator-driven agricultural vehicle and automatically moving, with the one or more computing devices, the autonomous agricultural vehicle relative to the operator-driven agricultural vehicle.

13. A system for transporting autonomous agricultural vehicles, the system comprising:
    an operator-driven agricultural vehicle configured to be driven by an operator, the operator-driven agricultural vehicle including a front end facing towards a forward travel direction of the operator-driven agricultural vehicle, a rear end facing away from the forward travel direction, and a hitch attached to the rear end;
an autonomous agricultural vehicle configured for autonomous operation, the autonomous agricultural vehicle including a front end, an opposite rear end, and a hitch attached to the rear end of the autonomous agricultural vehicle; and
wherein the hitch of the autonomous agricultural vehicle is coupled with the hitch of the operator-driven agricultural vehicle such that the operator-driven agricultural vehicle is configured to tow the autonomous agricultural vehicle with the rear end of the autonomous agricultural vehicle facing the forward travel direction of the operator-driven agricultural vehicle;
at least one of the hitch of the autonomous agricultural vehicle or the hitch of the operator-driven agricultural vehicle includes a hitch arm and an associated actuator configured to deploy the hitch arm; and
the autonomous agricultural vehicle includes an autonomous agricultural vehicle controller including a processor and associated memory, the memory storing instructions that, when executed by the processor, configure the implement controller to:
sense a hitch distance between the hitch of the operator-driven agricultural vehicle and the hitch of the autonomous agricultural vehicle;
compare the distance with a predetermined distance range; and when it is determined that the sensed hitch distance is within the predetermined distance range, automatically deploy the hitch arm.

14. The system of claim 13, further comprising:
a first electrical system associated with the autonomous agricultural vehicle; and
a second electrical system associated with the operator-driven agricultural vehicle, the second electrical system being electrically connected with the first electrical system to form an electrical connection between the vehicles when the operator-driven agricultural vehicle is towing the autonomous agricultural vehicle.

15. The system of claim 13, wherein:
the autonomous agricultural vehicle includes a first hydraulic system;
the operator-driven agricultural vehicle includes a second hydraulic system; and
the first hydraulic system of the autonomous agricultural vehicle is hydraulically connected with the second hydraulic system of the operator-driven agricultural vehicle to form a hydraulic connection when the operator-driven agricultural vehicle is towing the autonomous agricultural vehicle.

16. The system of claim 13, wherein the operator-driven agricultural vehicle further includes an operator-driven agricultural vehicle controller in wireless communication with the autonomous agricultural vehicle controller.

17. A system for transporting autonomous agricultural vehicles, the system comprising:
an operator-driven agricultural vehicle configured to be driven by an operator, the operator-driven agricultural vehicle including a front end facing towards a forward travel direction of the operator-driven agricultural vehicle, a rear end facing away from the forward travel direction, and a hitch attached to the rear end;
an autonomous agricultural vehicle configured for autonomous operation, the autonomous agricultural vehicle including a front end, an opposite rear end, and a hitch attached to the rear end of the autonomous agricultural vehicle; and
wherein the hitch of the autonomous agricultural vehicle is coupled with the hitch of the operator-driven agricultural vehicle such that the operator-driven agricultural vehicle is configured to tow the autonomous agricultural vehicle with the rear end of the autonomous agricultural vehicle facing the forward travel direction of the operator-driven agricultural vehicle;
wherein the autonomous agricultural vehicle includes an agricultural implement attached to the front end of the autonomous agricultural vehicle and facing opposite the forward travel direction of the operator-driven agricultural vehicle.

* * * * *